S. Hutchinson.

Potato Planter.

Nº 10,154.  Patented Oct. 25, 1853.

UNITED STATES PATENT OFFICE.

SAMUEL HUTCHINSON, OF ROCKPORT, INDIANA.

IMPROVEMENT IN CUTTING AND PLANTING POTATOES.

Specification forming part of Letters Patent No. 10,154, dated October 25, 1853.

*To all whom it may concern:*

Be it known that I, SAMUEL HUTCHINSON, of Rockport, in the county of Spencer and State of Indiana, have invented a new and useful Machine for Planting Potatoes; and I do hereby declare the following to be a full, clear, and exact description thereof, reference being had to the annexed drawings, making part of this specification.

My invention has for its object the cutting, dropping, planting, and covering seed-potatoes.

Figure 1:
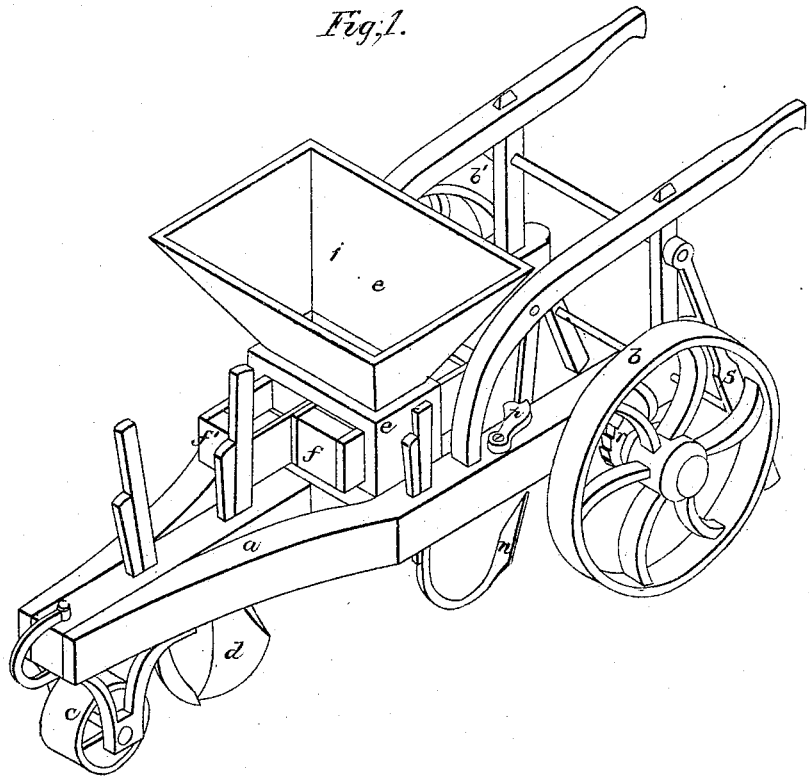
Figure 2:
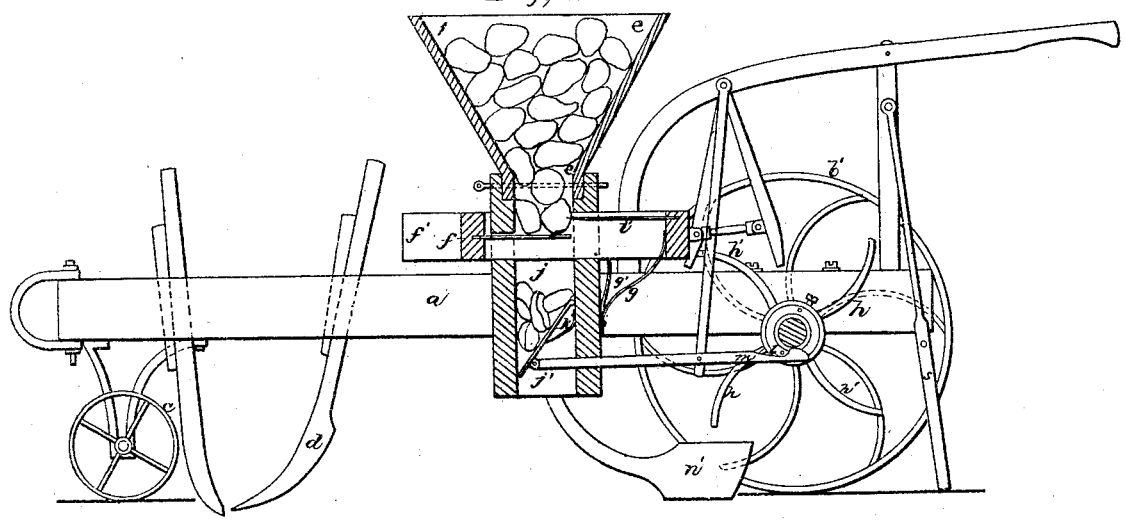

In the accompanying drawings, Figure 1 is a perspective view, and Fig. 2 is a vertical section.

$a$ is a frame supported on three wheels, two, $b$, being behind, and one, $c$, in front.

$d$ is a share (which is adjustable) for making the furrow to receive the potatoes.

$e$ is a box whose upper portion, 1, is supplied with potatoes. This box is traversed by sliding floors $f f'$, which, being held to their rearmost position by springs $g g'$, retain the potatoes until such time as the cams $h h'$ on the axle of the wheels $b b$, by pressing the floors forward, cause the knives $i i'$ (one only seen) to slice the lowermost stratum of potatoes, which being accomplished the sliced portions drop through the spout $j j'$ and the floors return to their original position. The sliced portions are received by a trap-door, K, which, being suddenly retracted by a pin, $l$, acting on a notched rod, $m$, attached to the door, drops a charge of potatoes into the furrow. Then two blades (one of which, $n$, is shown in one view, and the other, $n'$, in the other view) scrape the earth back over the potatoes and effectually cover them. I have here applied two sliding floors or platforms and corresponding cams and cutting-blades, and made one set of the cams, $h'$, adjustable on the wheel-shaft, so that the cams can be arranged to act either in concert or alternately, according to whether it be the desire to plant in distinct hills or in a continuous drill. In the latter case the trap-door is held permanently back by the catch $p$, so as to present no interruption to the dropping of the potatoes. A ratchet and pawl, $r$, preventing the return movement of the driving-wheel, remove thereby any liability to disarrangement of the action, so that by starting the machine at the right spot the hills are properly distanced all across the field. The swinging legs $s$ are to lift the wheels $b b'$ off the ground when it is desired to start at a particular point.

By means of this machine a man and horse can plant five acres a day, which is ten days' work by the ordinary method, and not unfrequently a portion of the ground becomes less suitable than when first stirred before the planting is completed.

I claim herein as new and of my invention, and desire to secure by Letters Patent—

The construction and combination, as herein described, of cam, sliding platform, cutting-blade, and trap-door with the furrowing-share and covering-blade, for the purpose of cutting, dropping, distancing, and covering potatoes.

In testimony whereof I have hereunto set my hand before two subscribing witnesses.

SAMUEL HUTCHINSON.

Witnesses:
GEO. H. KNIGHT,
J. H. GETZENDANNER.